United States Patent [19]
Hunt

[11] Patent Number: 5,996,720
[45] Date of Patent: *Dec. 7, 1999

[54] DUAL DISCONNECT DRIVE ASSEMBLY

[75] Inventor: William G. Hunt, Roanoke, Ind.

[73] Assignee: Dana Corporation, Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,040

[22] Filed: May 21, 1996

[51] Int. Cl.$^6$ .............................. B60K 23/08; F16H 48/10
[52] U.S. Cl. ............................................ 180/247; 475/230
[58] Field of Search ................... 180/247, 76; 475/230, 475/234, 235, 237, 242, 331

[56] References Cited

U.S. PATENT DOCUMENTS

| | | | |
|---|---|---|---|
| 1,145,295 | 7/1915 | De Witt | 74/710.5 |
| 1,243,720 | 10/1917 | Eidson et al. | 74/710.5 |
| 1,290,111 | 1/1919 | Deckert . | |
| 1,631,837 | 6/1927 | Stone . | |
| 2,913,929 | 11/1959 | Anderson | 475/230 |
| 3,115,790 | 12/1963 | Cornish et al. | 475/230 |
| 3,523,467 | 8/1970 | Shachter | 475/235 |
| 3,624,717 | 11/1971 | Brubaker | 475/230 |
| 4,271,722 | 6/1981 | Campbell | 74/710.5 |
| 4,304,317 | 12/1981 | Vanzant et al. | 475/230 |
| 4,526,063 | 7/1985 | Oster | 475/237 |
| 4,625,584 | 12/1986 | Onodera | 74/713 |
| 4,779,698 | 10/1988 | Iwata | 180/247 |
| 4,915,190 | 4/1990 | Iwata | 180/247 |
| 4,981,192 | 1/1991 | Kurihara et al. | 180/247 |

*Primary Examiner*—Anthony Knight
*Assistant Examiner*—John L. Beres
*Attorney, Agent, or Firm*—Oldham & Oldham Co., L.P.A.

[57] ABSTRACT

A dual disconnect differential assembly for four-wheel drive (4WD) vehicle is disclosed. This disconnect differential assembly connects both output shafts of a differential assembly (and correspondingly both axle shafts which are driven by the respective output shafts) simultaneously. The dual differential assembly herein also disconnects both output shafts simultaneously. A clutch mechanism associated with the two differential side gears (which may be otherwise conventional) and with annular driven gears which are in driving engagement with respective output shafts, is provided for simultaneous connection and simultaneous disconnection of the output shafts. The dual disconnect differential assembly herein is simple, compact, and reliable. It overcomes the disadvantages associated with single axle disconnect mechanisms presently in use. It also provides a simpler, more compact, and more reliable dual disconnect differential mechanism than any such mechanism presently known.

20 Claims, 2 Drawing Sheets

DUAL DISCONNECT DRIVE ASSEMBLY

TECHNICAL FIELD

This invention relates to differential disconnect drive assemblies or mechanisms, and in particular to dual disconnect drive assemblies, for four-wheel drive vehicles which can be operated in either a two-wheel drive mode or a four-wheel drive mode.

BACKGROUND ART

Four-wheel drive vehicles which are operable in either a two-wheel drive mode or a four-wheel drive mode have gained widespread popularity. Axle disconnect mechanisms, or differential disconnect mechanisms or assemblies for such vehicles are known.

Commonly used disconnect mechanisms for four-wheel drive vehicles disconnect only one of the two output shafts on an axle assembly which is driven part time. This causes the pinion gears and the side gears of the differential to rotate due to back driving, although the differential case remains stationary. This is not compatible with speed-sensitive limited slip differentials. Also, single axle disconnect mechanisms may cause noise and wear and poor fuel economy due to rotation of the differential components while the vehicle is in two-wheel drive mode.

Various dual disconnect differential assemblies or mechanisms have been proposed. These mechanisms in general have a number of moving parts, are fairly complex, and would be suitable only for installation on relatively wide vehicles because of the space required. None has achieved commercial acceptance.

SUMMARY OF THE INVENTION

This invention comprises a differential having first and second side gears which are rotatable about a common transverse axis. Rotatable first and second output shafts are co-axial with the side gears, and a clutch mechanism is used for placing the output shafts simultaneously into or simultaneously out of driving engagement with the respective side gears. An actuator is used to slidably move the driven gears between the clutch engaging position and the clutch disengaging position. There is further provided clutch members on each of the side gears, and a plurality of axially slidable members in abutting end-to-end relationship which comprises first and second driven gears slidably and non-rotatably mounted on the first and second output shafts, respectively. The driven gears have clutch members for engaging the clutch members of the respective first and second side gears, with the driven gears being simultaneously slidable in a first direction to a clutch engaging position and simultaneously slidable in a second direction to a clutch disengaging position.

A preferred dual disconnect differential assembly according to the invention further includes, as axially slidable members, a slide collar between the first and second driven gears, and a clutch collar slidably mounted on one of the output shafts in a position outboard of an adjacent driven gear. A biasing means is provided for biasing the driven gears to a clutch disengaging position. The vehicle is in two-wheel drive mode when the clutch is disengaged and in four-wheel drive mode when the clutch is engaged.

The differential assembly of the present invention possesses several advantages, including greater fuel economy, less wear, and less noise compared to previously known disconnect mechanism in which only a single output shaft and its axle shaft are disengaged from driving engagement with a differential when two-wheel drive mode is selected. Advantages of the present invention compared to previously known dual disconnect differential assemblies include fewer parts and greater compactness, which makes it possible to utilize the present dual disconnect drive mechanism on any size vehicle, including a sub-compact automobile. This makes it possible to offer four-wheel drive on smaller vehicles, including sub-compact automobiles, which have not previously had optional four-wheel drive because of the space requirements of presently known dual disconnect mechanism.

DESCRIPTION OF THE PREFERRED EMBODIMENTS

This invention will now be described in detail with reference to the best mode and preferred embodiments thereof.

Figure 1:
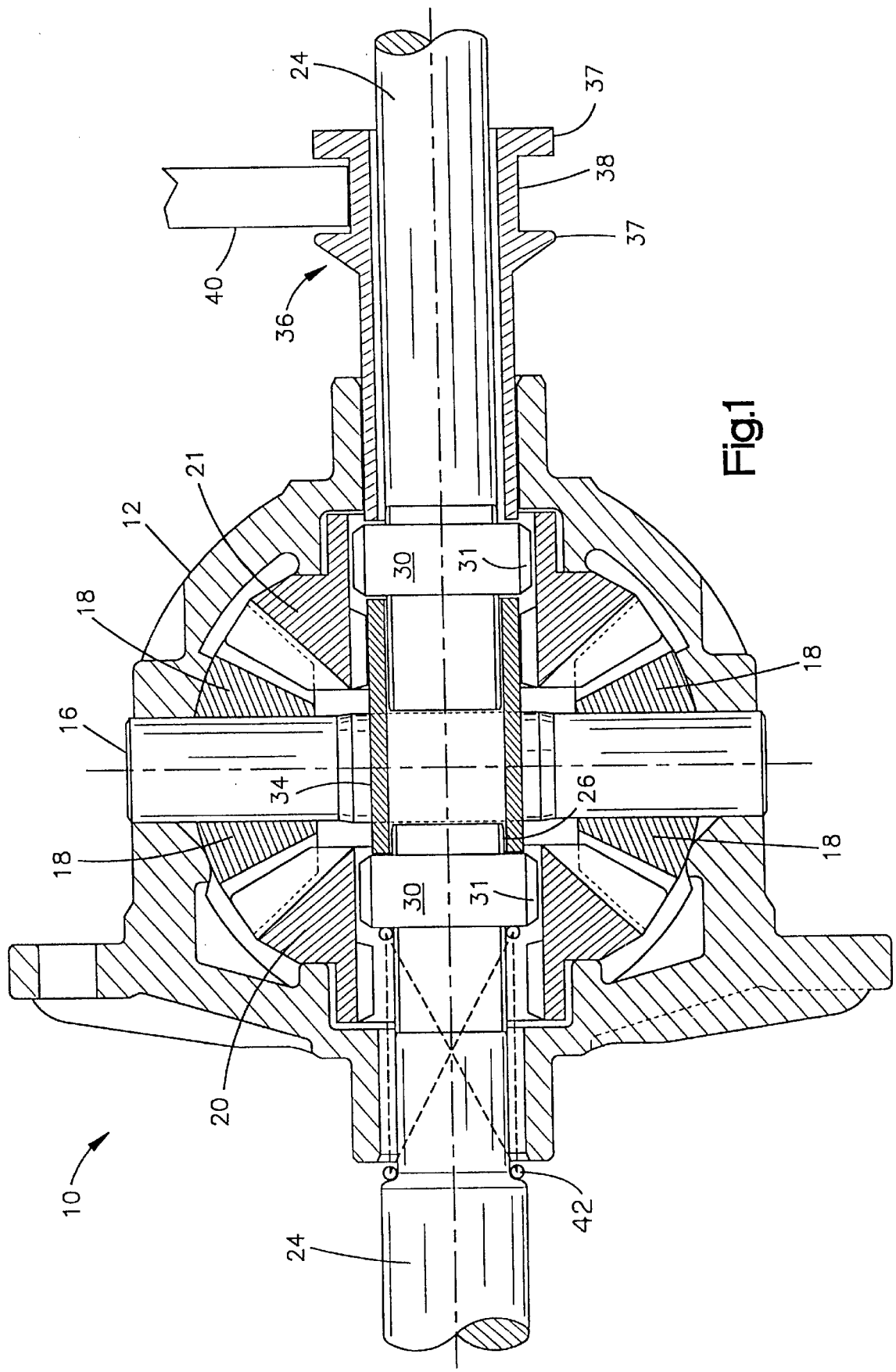
FIG. 1 is a sectional plan view of apparatus according to a preferred embodiment of the invention.

Referring now to FIG. 1, a dual disconnect differential assembly 10 (or mechanism) according to this invention is shown for a front axle of a four-wheel drive (4WD) vehicle having a full-time rear axle and a part-time front axle.

The differential assembly 10 in general is driven by a longitudinally extending pinion shaft (or input shaft) not shown, which in turn may be driven by a drive shaft (not shown) which extends longitudinally from a vehicle transmission. The pinion shaft may engage a ring gear (not shown), which is affixed (e.g., bolted) to a differential case 12. Differential case 12 is rotatably mounted in a differential housing (not shown) by means of bearings (not shown). Differential case 12 and the ring gear affixed thereto rotate about a transverse horizontal axis, which is the axis of output shafts (to be described later) and axle shafts coupled respectively thereto.

The differential used in the practice of this invention may further include a differential cross pin 16, and pinion gears 18 which are rotatably mounted with respect to cross pin 16. The differential further includes first (or left-hand) and second (or right-hand) side gears 20 and 21, respectively (see FIGS. 1, 2, and 3). Side gears 20 and 21 are coaxial and rotate about a common transverse axis, which is also the common axis of the aforementioned output shafts and axle shafts.

Figure 2:
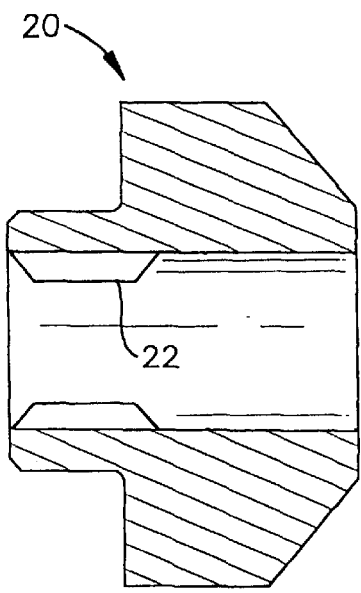
FIGS. 2 and 3 are longitudinal sectional views, on an enlarged scale, of a left-hand side gear and a right-hand side gear, respectively, according to the preferred embodiment of this invention.
Figure 3:
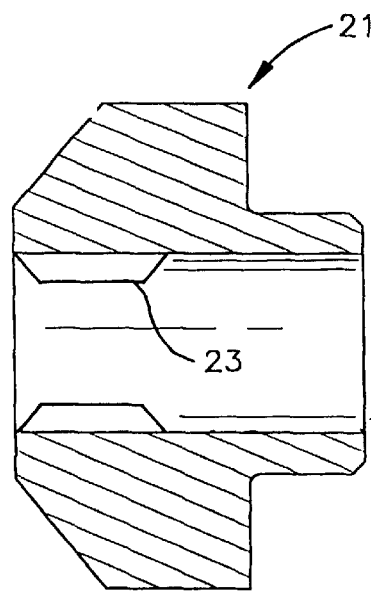

Side gears 20, 21 have respective clutch members in the form of splines 22, 23, respectively, as best seen in FIGS. 2 and 3. These splines are formed on central bores of respective side gears 20, 21 near the left-hand ends thereof, at the outboard end of left-hand side gear 20 and at the inboard end of right-hand side gear 21.

The dual disconnect differential assembly 10 of this invention further includes coaxial first (or left-hand) and second (or right-hand) output shafts 24. These output shafts 24 extend transversely and are coaxial with side gears 20, 21. These output shafts 24 extend from inboard ends near cross pin 16 to outboard ends which extend outside the differential housing. Splines 26 are provided at the inboard ends of output shafts for driving the same. Joints or flanges which may be conventional (e.g., universal joints), are provided at respective outboard ends of output shafts 24 for coupling of axle shafts to respective output shafts 24 in driving engagement. These axle shafts are coaxial with the output shafts 24 and extend transversely outwardly to wheels (not shown) at the sides of the vehicle.

The dual disconnect differential assembly 10 of this invention includes a clutch mechanism for simultaneously placing both output shafts 24 either into or out of driving engagement with respective side gears 20, 21. The splines 22, 23 on respective side gears 20, 21 form part of this clutch assembly or mechanism.

Figure 4:
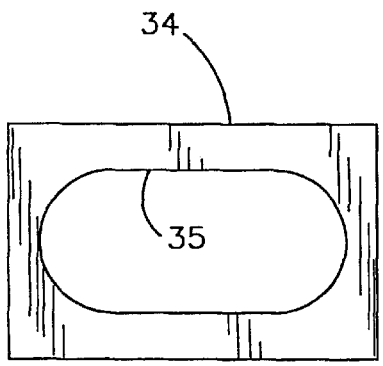
FIG. 4 is a plan view of a slide collar according to the preferred embodiment of this invention.
Figure 5:
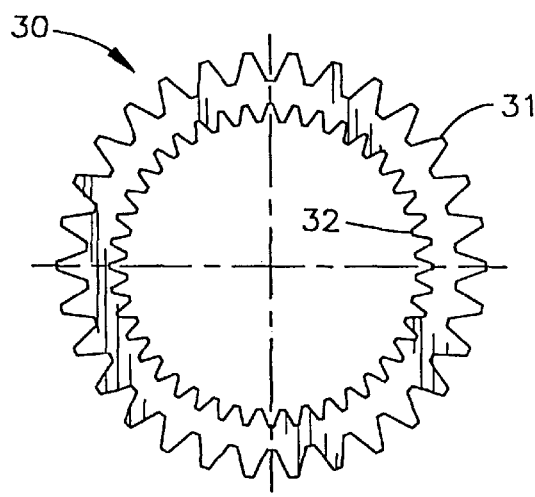
FIG. 5 is an end view of a driven gear according to the preferred embodiment of this invention.

The clutch mechanism further includes a plurality of axially slidable coaxial annular members in abutting end-to-end relationship. The axially slidable members, from left to right as seen in FIG. 1, are a first or left-hand driven gear 30 having clutch members in the form of external splines formed on the outer surface thereof, and internal splines 32 for drivingly engaging respective output shafts 24. A slide collar 34 (seen in plan view in FIG. 4), having diametrically opposite laterally extending slots 35 is provided, along with a second or right-hand driven gear 30, identical to the first or left-hand driven gear 30. A clutch collar 36 is provided, and has, on the outer surface thereof, a pair of spaced collars 37 which form a groove 38 for receipt of a clutch actuator 40.

It is noted that only one clutch collar 36 is required. This clutch collar is slidably and rotatably mounted on one of the output shafts 24 (in this case, the right-hand output shaft) and is outboard of and in abutting end-to-end relationship with an adjacent driven gear 30.

Driven gears 30 are slidably but non-rotatably mounted on respective output shafts 24. Internal splines 32 on the driven gears 30, and external splines 26 on the output shafts 24, prevent relative rotation while permitting axial sliding movement of the driven gears. Thus, driven gears 30 rotate with the respective output shafts 24 on which they are mounted.

The entire set of axially slidable members, including driven gears 30, slide collar 34, and clutch collar 36, are shown in clutch disengaging position in FIG. 1, being the normal position. Upon actuation, as will be described subsequently, the axially slidable members 30, 34, and 36 slide to the left as seen in FIG. 1 into a clutch engaging position, in which clutch members or splines 31 on respective driven gears 30 are in engagement with respective splines 22, 23 on respective side gears 20, 21. Output shafts 24 rotate with respective side gears 20, 21 when the clutch mechanism is in the clutch engaging position, and rotate independently of the respective side gears 20, 21 when the clutch mechanism is in the clutch disengaging position.

The slide collar 34 is slidably mounted on output shafts 24, at the inboard ends thereof. The slide collar 34 extends across the gap between the inboard ends of output shafts 24. Diametrically opposite slots 35 in slide collar 34 receive the differential cross shaft 16. The ends of slide collar 34 are in end-to-end abutting relationship with respective driven gears 30 on either side. Driven gears 30 and output shafts 24 rotate independent of slide collar 34.

The clutch collar 36 is slidably and rotatably mounted on the second or right-hand output shaft 24. One end of clutch collar 36 (the left end as seen in FIG. 1) is in end-to-end abutting relationship with the second (or proximate) driven gear 30, so that when clutch collar 36 moves axially to the left (to clutch engaging position), the entire set of axially slidable annular members 30, 34, and 36 will simultaneously move to the left.

A compression spring 42 serves as biasing means to urge the axially slidable annular members 30, 34, and 36 to clutch disengaging position, i.e., to the right as seen in FIG. 1. Spring 42 surrounds the first or left-hand output shaft 24. The ends of spring 42 are in engagement with the outer (or left) end of first driven gear 30 and with a shoulder in left-hand output shaft 24.

To actuate the clutch mechanism, a clutch actuator 40 may be provided as a shift fork having a bifurcated end portion which is received in groove 38 of clutch collar 36. The shift fork 40 may be actuated by known means, e.g., by vacuum (which is preferred) or by hydraulic, pneumatic, electrical, or mechanical means. Actuation may be initiated either automatically or by a manual operator, such as a manual or pedal control in the vehicle cab.

The driven gears 30 and clutch collar 36 are normally in clutch disengaging position, i.e., to the right as seen in FIG. 1. The vehicle is in two-wheel drive (2WD) mode when the clutch is disengaged. To engage the clutch mechanism and place the vehicle in four-wheel drive (4WD) mode, clutch actuator 40 moves clutch collar 36 to the left as seen in FIG. 1 against the bias of compression spring 42. Clutch collar 36 pushes the driven gears 30 and the slide collar 34 to the left against the bias of spring 42, thereby placing the clutch members or splines 31 on respective driven gears in engagement with respective clutch members or splines 22, 23 on respective side gears 20, 21. With the clutch mechanism thus engaged, the output shafts 24 are constrained to rotate at the same speeds as respective side gears 20, 21 and power is transmitted to the respective axle shafts (not shown). When the need for four-wheel drive no longer exists, clutch actuator 40 is moved to the right. This also slides clutch collar 36 to the right. Compression spring 42 then pushes driven gears 30 and slide collar 34 to the right, i.e., to the clutch disengaging position, to return the vehicle to two-wheel drive mode.

The drawings herein show a differential assembly for a front axle of a vehicle. Most current vehicles which have four-wheel drive have a full-time rear axle and a part-time front axle. However, some recent four-wheel drive vehicles have a full-time front axle and a part-time rear axle. The differential assembly of this invention can be used on either the front axle or the rear axle, whichever is the part-time axle.

The compression spring 42 (or other biasing means) is normally biased toward the clutch disengaging position, which results in disengagement of the part-time axle, since it is normally preferred to operate in two-wheel drive mode with the part-time axle disengaged except when driving conditions call for four-wheel drive operation. However, this spring can be biased toward clutch engaging position if desired. Other biasing means, as for example, an air spring, can be used in place of the compression spring shown if desired.

Further, the biasing means can be dispensed with entirely provided that some means, such as magnets on the abutting ends of each coaxial member 34 and 36 are provided (except that no such magnets are required on the outside ends of left-hand driven gear 30 or clutch collar 36) so as to keep the axially slidable members 30, 34, and 36 in abutting relationship. Such magnets, if used, must not be so strong as to prevent or impede relative rotation between adjacent axially slidable members. Other mechanical mechanisms which function to shift the driven gears 30 and slide collar 34 to the clutch disengaging position are also contemplated herein.

It is possible to use a solenoid operator, e.g., an annular solenoid operator surrounding the output shafts 24 just beyond the outermost axially slidable member, and, in that case, to dispense with clutch collar 36 if desired. However, the illustrated apparatus, including a clutch collar 36 and a shift fork 40, is preferred since this gives more versatility both as to type and location of the actuator.

It is also possible to use a spider (which typically including a ring at its center with a plurality of radially extending arms extending outwardly from the ring) in place of the cross pin 16 if desired. In that case, it is possible (although not preferred) to eliminate slide collar 34 and to extend the two driven gears 30 axially inwardly so that they are directly in abutting end-to-end relationship.

While driven gears 30 have external splines for such purposes extending over their entire length are illustrated, it will be apparent that the axial length of the driven gears may be longer than that herein illustrated, and that these external splines need not extend over the entire length. In such case, the splined portion would be to the right as seen in FIG. 1. This is ordinarily not preferred because it would require left and right driven gears which are not identical to each other in most cases, except where the axial length of the splined portion is exactly one-half the total axial length of the driven gear.

The present invention provides a simple and reliable mechanism for simultaneous differential connect and simultaneously disconnect. In other words, both output shafts 24 are simultaneously connected or disconnected from their respective side gears 20, 21 in the apparatus of this invention. The novel dual disconnect differential assembly herein avoids the known disadvantages of single shaft disconnect mechanism, such as back drive, as has been discussed earlier.

The dual disconnect differential assembly of this invention is also compact. This makes part-time, dual disconnect four-wheel drive for compact and sub-compact vehicles possible.

The two side gears 20, 21 are free to rotate at different speeds, whether the output shafts 24 are engaged with or disengaged from the respective side gears 20, 21. However, if desired, a differential assembly for a part-time axle as herein illustrate can be further provided with a differential lockout mechanism (which may be conventional) if desired.

While this invention has been described in detail with reference to the preferred embodiments thereof, it shall be understood that various modifications (including those specifically discussed above and others) can be made without departing from the scope and spirit of this invention.

What is claimed is:

1. In a dual disconnect differential assembly for an automotive vehicle, comprising pinion gears rotatably mounted with respect to a cross pin, first and second side gears being rotatable about a common transverse axis, rotatable first and second output shafts which are co-axial with said first and second side gears, respectively, wherein the improvement comprises:

first clutch members on said first and second side gears; and first and second driven gears slidably and non-rotatably mounted on said first and second output shafts, respectively, said first and second driven gears having second clutch members for engaging said first clutch members of respective first and second side gears, a slide collar positioned about said cross pin between said first and second driven gears, and said slide collar being simultaneously slidable in a first direction to a clutch engaging position and simultaneously slidable in a second direction to a clutch disengaging position by means of a clutch actuator having a compression spring.

2. The dual disconnect differential assembly according to claim 1, wherein said slide collar is in abutting relationship with said first and second driven gears.

3. The dual disconnect differential assembly according to claim 1, further including a clutch collar which is mounted on one of said first and second output shafts for axially moving said first and second driven gears simultaneously in the same direction between said clutch engaging position and said clutch disengaging position and wherein said actuator includes an arm for engaging said clutch collar for slidably moving said clutch collar and said first and second driven gears between said clutch engaging position and said clutch disengaging position.

4. The dual disconnect differential assembly according to claim 1, wherein said slide collar is in abutting relationship with said first and second driven gears and a clutch collar is mounted on one of said first and second output shafts for axially moving said first and second driven gears simultaneously in the same direction between said clutch engaging position and said clutch disengaging position and wherein said actuator includes an arm for engaging said clutch collar for slidably moving said clutch collar and said first and second driven gears between said clutch engaging position and said clutch disengaging position.

5. The dual disconnect differential assembly according to claim 1, wherein outer surfaces of said first and second output shafts and inner surfaces of said first and second driven gears have complementary splines.

6. The dual disconnect differential assembly according to claim 1, wherein said first and second side gears have axially extending central bores, said first clutch members on said first and second side gears are splines formed on portions of said bores, said second clutch members on said first and second driven gears are splines formed on outer surfaces thereof, the splines on said first and second side gears and the splines on said first and second driven gears being in engagement when said first and second driven gears are in said clutch engaging position and out of engagement when said first and second driven gears are in said clutch disengaging position.

7. The dual disconnect differential assembly according to claim 1, wherein said compression spring urges said first and second driven gears toward one of said clutch engaging position and said clutch disengaging position.

8. The dual disconnect differential assembly according to claim 7, wherein said compression spring urges said first and second driven gears toward said clutch disengaging position.

9. The dual disconnect differential assembly according to claim 1, wherein said compression spring urges said first and second driven gears and said slide collar toward said clutch disengaging position.

10. The dual disconnect differential assembly according to claim 1, wherein said first and second output shafts are in driving engagement with said first and second side gears when said first and second driven gears are in said clutch engaging position and are in free-wheeling mode when said first and second driven gears are in said clutch disengaging position.

11. The dual disconnect differential assembly according to claim 10, wherein said first and second output shafts and said first and second side gears are capable of rotation at different speeds in both driven mode and free-wheeling mode of said first and second output shafts.

12. In a dual disconnect differential assembly for an automotive vehicle, comprising a differential having pinion gears, first and second side gears which are rotatable about a common transverse axis, rotatable first and second output shafts which are co-axial with said first and second side gears, a clutch mechanism for placing said first and second output shafts simultaneously into and out of driving engagement with respective first and second side gears, and an actuator for slidably engaging and disengaging said clutch mechanism, wherein the improvement comprises:

clutch members on each of said side gears;

a plurality of axially slidable members in abutting end-to-end relationship, said plurality of axially slidable members comprising first and second driven gears slidably and non-rotatably mounted on said first and second output shafts, respectively, said driven gears having clutch members for engaging said clutch members of respective first and second side gears, said first and second driven gears being simultaneously slidable in a first direction to a clutch engaging position and simultaneously slidable in a second direction to a clutch disengaging position; and a biasing mechanism comprised of a compression spring for urging said driven gears toward one of said clutch engaging position and said clutch disengaging position.

13. The dual disconnect differential assembly according to claim 12, in which said compression spring urges said first and second driven gears and said clutch mechanism toward said clutch disengaging position.

14. The dual disconnect differential assembly according to claim 12, wherein said compression spring is co-axial with at least one of said first and second output shafts.

15. The dual disconnect differential assembly according to claim 12, wherein said compression spring urges said first and second driven gears to said clutch disengaged position.

16. The dual disconnect differential assembly according to claim 12, further including a clutch collar which is mounted on one of said first and second output shafts for axially moving said first and second driven gears simultaneously in the same direction between said clutch engaging position and said clutch disengaging position and wherein said actuator includes an arm for engaging said clutch collar for slidably moving said clutch collar and said first and second driven gears between said clutch engaging position and said clutch disengaging position.

17. The dual disconnect differential assembly according to claim 12, wherein outer surfaces of said first and second output shafts and inner surfaces of said first and second driven gears have complementary splines.

18. The dual disconnect differential assembly according to claim 17, further including a clutch collar which is mounted on one of said first and second output shafts for axially moving said first and second driven gears simultaneously in the same direction between said clutch engaging position and said clutch disengaging position and wherein said actuator includes an arm for engaging said clutch collar for slidably moving said clutch collar and said first and second driven gears between said clutch engaging position and said clutch disengaging position.

19. The dual disconnect differential assembly according to claim 12, wherein said first and second output shafts are in driving engagement with said first and second side gears when said driven gears are in said clutch engaging position and are in free-wheeling mode when said first and second driven gears are in said clutch disengaging position.

20. The dual disconnect differential assembly according to claim 19, wherein said first and second output shafts and said first and second side gears are capable of rotation at different speeds in both driven mode and free-wheeling mode of said first and second output shafts.

* * * * *